US008255522B2

(12) United States Patent
Marwah et al.

(10) Patent No.: US 8,255,522 B2
(45) Date of Patent: Aug. 28, 2012

(54) EVENT DETECTION FROM ATTRIBUTES READ BY ENTITIES

(75) Inventors: Manish Marwah, Mountain View, CA (US); Ratnesh Kumar Sharma, Fremont, CA (US); Wilfredo E. Lugo, Rincon, PR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 845 days.

(21) Appl. No.: 12/399,488

(22) Filed: Mar. 6, 2009

(65) Prior Publication Data

US 2010/0229187 A1 Sep. 9, 2010

(51) Int. Cl.
*G06F 15/173* (2006.01)
*H04W 24/00* (2009.01)
(52) U.S. Cl. ............ 709/224; 709/223; 455/456.1
(58) Field of Classification Search .............. 709/223, 709/224, 230; 455/456.1, 456.6; 719/310; 340/870.1
See application file for complete search history.

(56) References Cited

U.S. PATENT DOCUMENTS

| | | | | |
|---|---|---|---|---|
| 7,039,953 B2* | 5/2006 | Black et al. | ............ | 726/14 |
| 7,649,853 B1* | 1/2010 | Nucci et al. | ............ | 370/254 |
| 8,015,604 B1* | 9/2011 | Tidwell et al. | ............ | 726/22 |
| 8,156,553 B1* | 4/2012 | Church et al. | ............ | 726/22 |
| 2003/0046582 A1* | 3/2003 | Black et al. | ............ | 713/201 |
| 2005/0057370 A1* | 3/2005 | Warrior et al. | ............ | 340/870.01 |
| 2006/0099971 A1* | 5/2006 | Staton et al. | ............ | 455/456.6 |

OTHER PUBLICATIONS

Spiros Papadintriou et al., "Streaming Pattern Discovery in Multiple Time-Series", Proceedings of the 31st VLDB Conference, Trondheim, Norway, 2005.
Evan Hoke et al., "InteMon: Continuous Mining of Sensor Data in Large-scale Self-* Infrastructures", ACM SIGOPS Operating Systemss Review, 40(3), Jul. 2006.

* cited by examiner

*Primary Examiner* — Peling Shaw

(57) ABSTRACT

A method for detecting events based upon attributes read by a plurality of entities includes receiving data pertaining to the read attributes from the plurality of entities, performing a correlation analysis on the data to identify a number of independent variables existing among the read attributes for each of a plurality of groupings of the plurality of entities in a first hierarchical level of the plurality of hierarchical levels, comparing the identified number of independent variables with a nominal number of independent variables for each of the plurality of groupings in the first hierarchical level, and determining that an event has been detected in response to the identified number of independent variables falling outside of a predetermined value of the nominal number of independent variables for a particular grouping in the first hierarchical level.

20 Claims, 6 Drawing Sheets

EVENT DETECTION FROM ATTRIBUTES READ BY ENTITIES

CROSS-REFERENCE TO RELATED APPLICATION

The present application has the same Assignee and shares some common subject matter with PCT Patent Application No. PCT/US08/54722, filed on Feb. 22, 2008, by Ratnesh Sharma et al., the disclosure of which is hereby incorporated by reference in its entirety.

BACKGROUND

Conventional data centers are known to include a number of sensors positioned to detect various conditions at locations of interest in the data centers. The conditions include, for example, temperature, pressure, vibration, humidity, energy consumption, and airflow direction and velocity. The locations of interest have included inlets and outlets of electronics cabinets, inlets and outlets of air conditioning units, and outlets of ventilation tiles.

The sensors have also been networked to a database system to enable constant streaming of data to the database system. The database system often aggregates the streaming data, for instance, to monitor the network of sensors. Conventional database systems often receive massive amounts of streaming data from the sensors, which typically make the database systems prohibitively slow. These database systems employ threshold-based monitoring techniques to detect anomalies in the data center, and therefore do not provide real-time notification of events to enable proactive maintenance of the data center. Furthermore, while the database systems are often able to identify particular sensors and particular sensor types, they often do not provide information regarding the scope and location of detected anomalies. Conventional database systems are therefore unable to provide users or other applications immediate, real-time responses to anomalies in the data collected by the sensors. This problem is further exacerbated by recent trends to increase the size of data centers and thus, the number of sensors employed to detect conditions in the data centers.

It would thus be beneficial to have the capability to quickly and automatically identify events or anomalies in an environment containing a sensor network.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are a method for detecting events in an environment in a relatively quick and efficient manner and an analyzer configured to perform the method. The method involves implementing a correlation analysis on a data set to identify a number of independent variables existing in the data set and determining that an event has occurred when the identified number of independent variables differs from a nominal number of independent variables for the data set. The method further involves implementing the correlation analysis on hierarchically arranged data sets to identify the occurrence of the events at one or more of the hierarchical levels.

Through implementation of the method and analyzer disclosed herein, events, such as, changes or anomalies in temperature, pressure, vibration, humidity, energy consumption, airflow direction and velocity, server utilization, actuator set points, etc., read by a plurality of entities may quickly and efficiently be analyzed to identify the scope and location of the events occurring in an environment, such as a data center. In other words, the method and analyzer disclosed herein enable the automatic identification and scope of events occurring in an environment through a hierarchical analysis of a large set of data collected by the plurality of entities.

Figure 1:
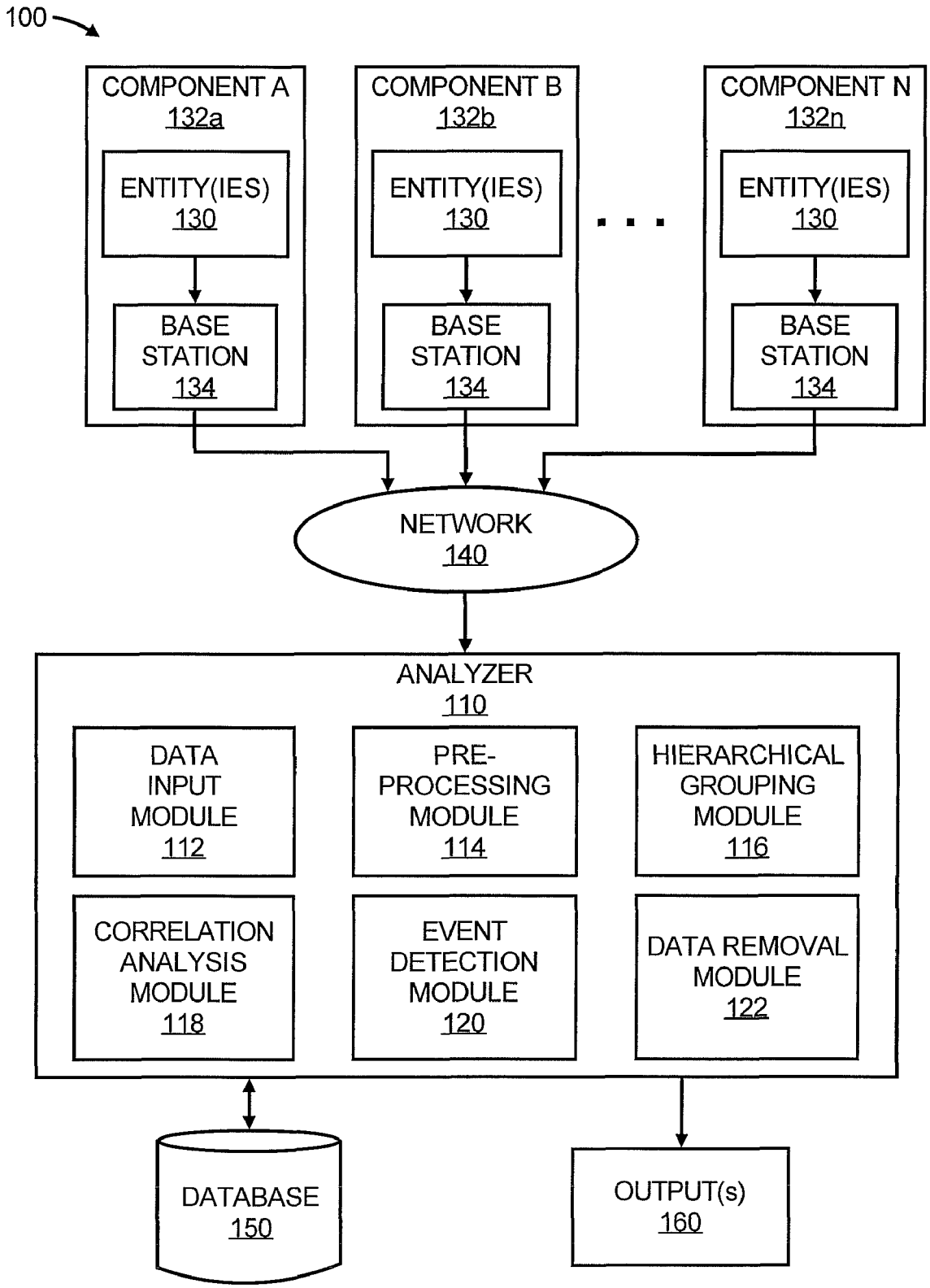
FIG. 1 depicts a simplified block diagram of an environment having an analyzer for detecting events in the environment, according to an embodiment of the invention.

With reference first to FIG. 1, there is shown a simplified block diagram of an environment 100 having an analyzer 110 for detecting events in the environment 100, according to an example. It should be understood that the environment 100 and the analyzer 110 may include additional components and that one or more of the components described herein may be removed and/or modified without departing from a scope of the environment 100 or the analyzer 110.

The environment 100 may comprise any reasonably suitable structure, location, space, etc., in which a plurality of entities 130, such as, sensors, are employed to detect one or more conditions. The environment 100 may also comprise any reasonable suitable structure, location, space, etc., in which data collected from the plurality of entities 130 are aggregated, for instance, for purposes of data mining, control over cooling systems, etc. Examples of suitable structures, locations, spaces, etc., include an IT data center, a section of an IT data center, a building, a room in a building, etc.

According to an example, the analyzer 110 comprises a computer-implemented apparatus configured to perform various computational processes in the environment 100. In this example, the analyzer 110 comprises, for instance, a microprocessor, an ASIC, a microcontroller, etc. The analyzer 110 may thus comprise a circuit or a processor in a computing device. The analyzer 110 may also comprise a computing device configured to perform the various functions discussed herein below.

According to another example, the analyzer 110 comprises computer-implemented software, for instance, that is executable by a microprocessor. In this example, the analyzer 110 may be stored, for example, on a memory of a computing device.

In either example, the analyzer 110 is depicted as collecting data from a plurality of entities 130. In one example, the entities 130 may comprise sensors and/or software configured to read attributes associated with one or more components 132a-132n in a data center, where "n" is an integer equal to or greater than one. The component(s) 132a-132n may comprise any suitable components normally found in data centers, which include, for instance, servers, network switches, power distribution units, hard drives, etc., as well as electronics cabinets (racks) for housing the servers, network switches, etc. Thus, for instance, the entities 130 may comprise physical condition detection sensors positioned to detect one or more of temperature, pressure, humidity, airflow direction and velocity, etc. flowing into or out of the respective components 132a-132n. In addition, or alternatively, the entities 130 may comprise physical condition detection sensors configured to detect at least one of vibration, energy consumption, etc., with respect to the components 132a-132n. As another example, the entities 130 may comprise hardware and/or software configured to detect utilization of the components 132a-132n, such as, utilization of CPUs in servers.

In any regard, data pertaining to the attributes read by the entities 130 may be communicated to the analyzer 110 through a network 140. The network 140 may comprise a wired or wireless communication link between the entities 130 and the analyzer 110. In this regard, the network 140 may comprise a local area network, a wide area network, the Internet, etc. Although not shown, the analyzer 110, or a computing device containing the analyzer 110, and the entities 130 may be equipped with hardware and/or software designed to enable transmission of data from the entities 130 and receipt of data from the entities 130.

The components 132a-132n are also depicted as including respective base stations 134. The base stations 134 generally comprise apparatuses configured and positioned to receive data from respective sets of entities 130 and communicate the data to the analyzer 110. In this regard, the base stations 134 may comprise the hardware and/or software to communicate the data collected by the entities 130 to the analyzer 110. The base stations 134, however, are considered optional because the entities 130 may be equipped to directly communicate the data pertaining to the read attributes to the analyzer 110. Although not shown, in instances where the base stations 134 are employed, a base station 134 may be configured to receive data from entities 130 of multiple components 132a-132n and to communicate the data to the analyzer 110.

In any event, the data pertaining to the attributes read by the entities 130 may be communicated to the analyzer 110 through implementation of any reasonably suitable data communication protocol over the network 140. In one example, the entities 130 and/or the base station 134 may be configured to communicate the data pertaining to the attributes read by the entities 130 as streaming data, for instance, as the attributes are read by the entities 130. In another example, the entities 130 and/or the base station 134 may be configured to communicate the data pertaining to the attributes read by the entities 130 at various intervals of time. In the second example, the entities 130 and/or the base station 134 may be configured to store one or more of the read attributes prior to communicating the data to the analyzer 110.

Generally speaking, the analyzer 110 is configured to analyze the data received from the entities 130 to identify one or more events in the environment 100, such as an IT data center. The one or more events may include anomalies in the attributes read by one or more of the entities 130. For instance, the analyzer 110 is configured to analyze trends in the data received from the entities 130 to quickly identify if the attributes read by any one of the entities 130 is anomalous with respect to the attributes read by other entities 130. By way of particular example in which the entities 130 are temperature sensors, the analyzer 110 may determine that one of the sensors is reading a temperature that differs from the temperatures read by the other sensors. As another example, the one or more events may include inefficiencies in the operation of various components in the environment 100, such as, for instance, identification of components that are consuming greater amounts of electrical energy than intended.

In addition, the analyzer 110 is configured to analyze the attributes of groupings of entities 130 at various hierarchical levels of entities 130. According to an example, by analyzing hierarchical groupings of the entities 130, the analyzer 110 is capable of obtaining a deeper insight into the location and nature of an event in the environment 100. In addition, the hierarchical grouping of entities 130 generally enables the analyzer 110 to identify the magnitude of the event based upon the hierarchy level at which the event was detected. Thus, for instance, an event detected at a lower level in the hierarchy may be considered as having a lower magnitude as compared with an event detected at a higher level in the hierarchy.

As shown in FIG. 1, the analyzer 110 includes a data input module 112, a pre-processing module 114, a hierarchical grouping module 116, a correlation analysis module 118, an event detection module 120, and a data removal module 122. The modules 112-122 may comprise software stored on a computer readable medium or they may comprise hardware, such as, circuits, or combinations thereof. The analyzer 110 may implement or invoke the modules 112-122 or a processor may implement or invoke the analyzer 110 itself to perform the functions discussed below.

The data input module 112 is configured to receive data from the entities 130 and/or the base stations 134 via the network 140 as streaming data or in bursts. The data input module 112 may thus include hardware and/or software to enable the analyzer 110 to connect to the network 140 through a wired or wireless connection. In any regard, the analyzer 110 is configured to store the data received from the entities 130 in a database 150. The analyzer 110 may also access the database 150 to retrieve stored data, including data pertaining to historically read attributes, to identify events in the data received from the entities 130. The database 150 may comprise volatile and/or non-volatile memory, such as DRAM, EEPROM, MRAM, flash memory, and the like. In addition, or alternatively, the data store 150 may comprise a device configured to read from and write to a removable media, such as, a floppy disk, a CD-ROM, a DVD-ROM, or other optical or magnetic media.

The pre-processing module 114 is configured to pre-process the data received from the entities 130 to render the data suitable for a correlation analysis to be performed on the received data. Thus, for instance, the pre-processing module 114 is configured to employ different pre-processing operations on the data based upon the type of correlation analysis to be performed on the data. In addition, the pre-processing may include, for instance, filtering of the data to substantially eliminate data due to random variations or noise in the data, normalizing the streaming data over a sliding window, transforming the data into desired formats, interpolating missing data, identifying and correcting invalid data, synchronizing time series data, etc.

By way of particular example, the pre-processing module 114 is configured to normalize streaming data over a sliding window to enable the correlation analysis module 118 to incrementally perform a correlation analysis on the streaming data in real-time. That is, the correlation analysis module 118 is configured to apply correlation analysis on multiple data streams by incrementally updating the number of independent variables as each data point is received. By incrementally analyzing the streaming data, unlike threshold methods where an anomaly is not detected until a threshold level is reached, the analyzer 110 is able to detect an event in real-time.

The hierarchical grouping module 116 is configured to classify the plurality of entities 130 into a plurality of groupings in each of a plurality of hierarchical levels. More particularly, for instance, for a first hierarchical level, the hierarchical grouping module 116 is configured to classify a first set of entities 130 into a first group, a second set of entities 130 into a second group, and so forth. In addition, for a second hierarchical level, the hierarchical grouping module 116 is configured to classify at least the first group and the second group into a combined group. The hierarchical grouping module 116 is configured to further classify the entities 130 in additional groups for the hierarchical levels.

The hierarchical grouping module 116 is configured to classify how the entities 130 are to be grouped based upon one or more characteristics of the entities 130. The characteristic(s) may include the locations of the entities 130, the locations of the components 132a-132n to which the entities 130 are associated, the types of attributes that the entities 130 are configured to read, the hardware and/or software configurations of the components 132a-132n to which the entities 130 are associated, etc.

By way of particular example, the environment 100 comprises a data center that houses a plurality of components 132a-132n, such as, servers, network switches, hard drives, etc., in a plurality of racks, which are arranged in a plurality of rows. In addition, the entities 130 comprise sensors positioned to detect a condition with respect to the plurality of components 132a-132n, such as, temperature sensors, humidity sensors, etc. In this example, a first hierarchical level comprises the racks, a second hierarchical level comprises a plurality of racks, for instance, the rows of racks, and a third hierarchical level comprises all of the racks in the data center. In addition, each of the groups in the first hierarchical level includes the sensors contained in each of the racks. Thus, for instance, a first group in the first hierarchical level includes all of the sensors in a first rack, a second group in the first hierarchical level includes all of the sensors in a second rack, and so forth.

Moreover, each of the groups in the second hierarchical level includes the sensors contained in each row of racks. Thus, for instance, a first group in the second hierarchical level includes all of the sensors in a first row of racks, a second group in the second hierarchical level includes all of the sensors in a second row of racks, and so forth. In addition, the third hierarchical level may include all of the sensors in the data center.

According to a first example, the hierarchical grouping module 116 is configured to automatically classify the entities 130 into the various groupings in the multiple hierarchical levels. In this example, the hierarchical grouping module 116 is equipped to identify one or more characteristics of the entities 130 and may use the characteristic(s) in determining how the entities 130 are to be grouped in the multiple hierarchical levels. According to a second example, the groupings into which the entities 130 may be user-defined through a communication interface with the analyzer 110. In this example, a user may instruct the hierarchical grouping module 116 of the hierarchical groupings of the entities 130.

Although particular reference is made throughout the present disclosure to the hierarchical grouping module 116 as being configured to classify the plurality of entities 130 into a plurality of groupings in each of a plurality of hierarchical levels, it should be understood that other elements, such as the hierarchical grouping module 116 may instead classify the components 132a-132n into a plurality of groupings in each of the plurality of hierarchical levels. Thus, for instance, the components 132a-132n may be grouped together in various manners according to at least one characteristic of the components 132a-132n.

The correlation analysis module 118 is configured to perform a correlation analysis on the data received from the entities 130 to identify a number of independent variables existing among the read attributes. More particularly, for instance, the correlation analysis module 118 is configured to perform a procedure that identifies correlations, such as, a quantification or qualification of the relationship between a set of data, between multiple variables, to identify one or more independent variables that fairly closely represent the correlations between multiple variables. In other words, the correlation analysis module 118 is configured to identify independent variables that capture the behavior (or trends) of the entities 130 in each of the groups of the multiple hierarchical levels.

By way of particular example in which a group contains five entities 130, each entity comprising a variable, the correlation analysis module 118 may represent the five entities 130 with a single independent variable in instances where the five entities 130 behave in similar manners and are thus able to be represented by a single independent variable. An example of similar behavior includes entities 130 that change in similar manners with respect to each other as conditions change, such as may occur between entities 130 that are closely located to each other, or as may occur between entities 130 that are configured to detect conditions of similarly configured components 132a-132n.

The identification of the number of independent variables by the correlation analysis module 118 is based upon the data contained in the data set being analyzed. Thus, for instance, the correlation analysis module 118 may analyze the data pertaining to the entities 130 in the first group of the first hierarchical level separately from the data pertaining to the entities 130 in the second group of the first hierarchical level to identify the independent variables for each of the groups in the first hierarchical level. Likewise, the correlation analysis module 118 may analyze the data pertaining to the entities 130 contained in the groups of the second hierarchical level separately from each other and from the groups contained in the first hierarchical level to identify the independent variables for each of the groups in the second hierarchical level. Moreover, the correlation analysis module 118 may analyze the data pertaining to the entities 130 in any remaining hierarchical levels separately from other hierarchical levels.

As discussed in greater detail herein below, the correlation analysis module 118 may iteratively perform the correlation analysis on the data sets pertaining to the multiple hierarchical levels of groups. Thus, for instance, the correlation analysis module 118 may perform the correlation analysis on the first hierarchical level of groups prior to performing the correlation analysis on the second hierarchical level groups.

In one particular example, the correlation analysis module 118 is configured to perform a principle component analysis (PCA) on the data. In this example, the correlation analysis module 118 may employ the techniques disclosed in the PCT Patent Application No. PCT/US08/54722. In other examples, the correlation analysis module 118 may employ other types of correlation analysis techniques configured to determine mutual relationships between multiple variables, such as, for instance, mutual information, which is derived from information theory, statistical classifiers, etc.

The event detection module 120 is configured to determine whether an event has occurred and to also determine a magnitude or scope of detected events. More particularly, for instance, the event detection module 120 is configured to determine that an event has occurred in response to a determination that the number of independent variables for a group has changed from a nominal number of independent variables for that group. According to an example, the event detection module 120 may be configured to determine that an event has occurred when a difference between the number of independent variables for a group and the nominal number of independent variables for the group exceeds a predetermined range of values. In this regard, the sensitivity at which the event detection module 120 determines that an event has occurred may be user-defined.

The event detection module 120 is thus configured to evaluate inter-relationships between the variables (the attributes read by the entities 130). As such, although the attributes being read by the entities 130 may change, if the variables all change together, then the number of independent variables will remain the same or relatively close to the nominal number of independent variables. It is this change in interrelationships that the event detection module 120 evaluates to determine whether an event has occurred.

The event detection module 120 is further configured to determine the nominal number of independent variables for each of the groups in each of the hierarchical levels. In one example, the event detection module 120 is configured to determine the nominal number of independent variables from a correlation analysis performed on one or both of real-time and historically read attributes, for instance during a initiation process. In another example, the event detection module 120 is configured to receive the nominal number of independent variables from a user. In either example, the event detection module 120 may modify the nominal number of independent variables for one or more of the groups as additional data is received from the entities 130, for instance, to update the nominal number of independent variables to compensate for changes in the environment 100.

The event detection module 120 is further configured to identify one or more entities 130 associated with the detected event. In one regard, the event detection module 120 is configured to identify the entities 130 associated with the detected event based upon respective probabilities that each of the entities 130 caused the event to occur. Thus, by way of particular example, the event detection module 120 is configured to identify which of the entities 130 has the highest probability of causing the number of independent variables for the group in which the event is detected to differ from the nominal number of independent variables for that group.

In addition, the event detection module 120 is configured to determine the magnitude or scope of detected conditions based upon the hierarchical level of the groups in which the events are detected. In other words, the event detection module 120 may determine that the magnitude or scope of a detected event is relatively low if the event is detected to have occurred in a group of a relatively low hierarchical level. Likewise, the event detection module 120 may determine that the magnitude or scope of a detected event is relatively high if the event is detected to have occurred in a group of a relatively high hierarchical level.

The data removal module 122 is configured to remove data related to the one or more entities 130 identified as being associated with a detected event from being considered during a correlation analysis performed by the correlation analysis module 118 on one or more groups in a higher hierarchical level. In one regard, by removing the data related to the one or more entities 130 identified as being associated with the detected event from consideration during performance of the correlation analysis for higher hierarchical levels, the event detection module 120 may be able to determine whether other events in the higher hierarchical levels exist. As such, the event detection module 120 may determine the magnitude or scope of the event based upon the highest level of the hierarchical levels that an event is determined to have occurred.

The analyzer 110 may output the identified events to one or more outputs 160. The analyzer 110 may output the identified events in any of various representations, which include graphs, plots, or other forms of data representation. According to an example, the analyzer 110 may output an indication, such as, an alarm, designed to alert data center personnel of the identified events. In addition, or alternatively, the output 160 comprises a display upon which a user may view the various representations. In another example, the output 160 comprises a computer readable storage medium on which the various representations may be stored. In a further example, the output 160 comprises a computing device that is connected to the analyzer 110 either locally or over a network. In any of these examples, the outputs of the analyzer 110 may be employed to dynamically monitor event occurrences in the environment 100.

Figures 2, 4:
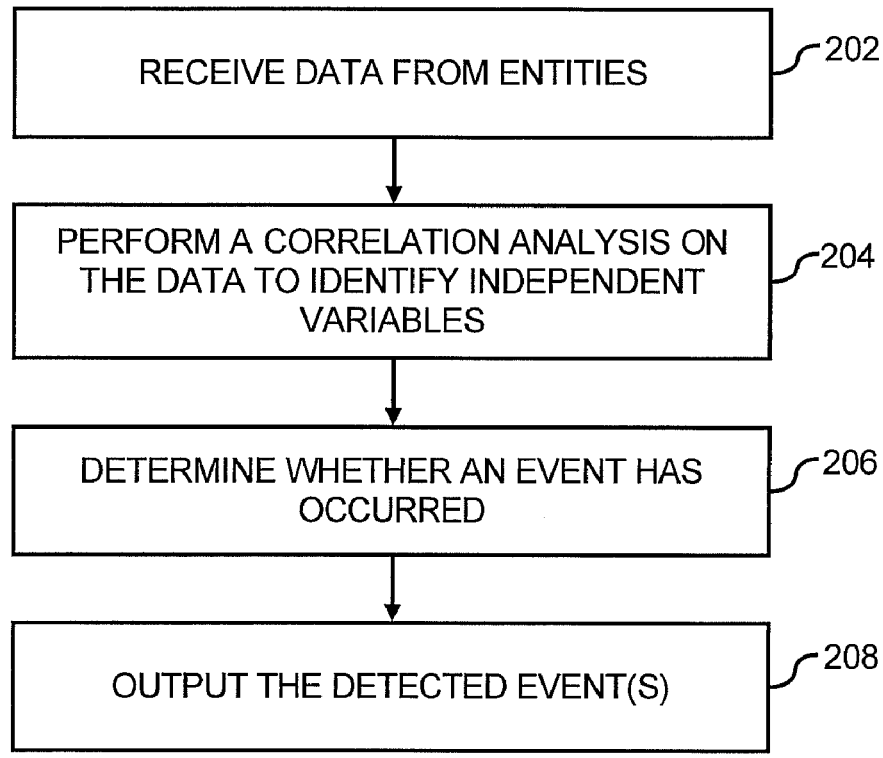
FIGS. 2 and 3, respectively, depict flow diagrams of computer-implemented methods for detecting events in an environment based upon attributes read by a plurality of entities, according to an embodiment of the invention.
FIG. 4 depicts a matrix containing data and timestamps, which is used as an input to a principle component analysis (PCA) module, according to an embodiment of the invention.
Figure 3:
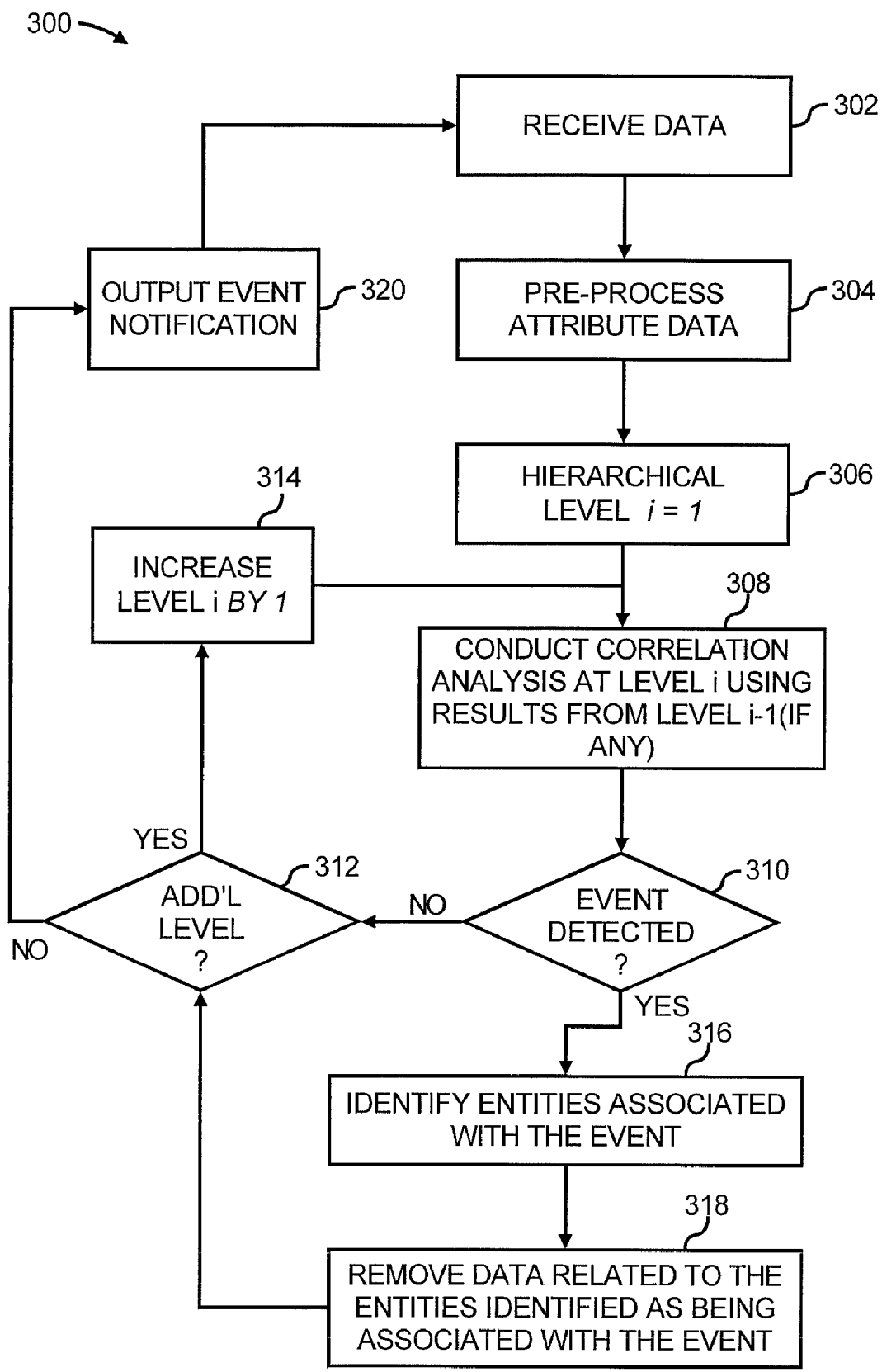

Turning now to FIGS. 2 and 3, there are shown respective flow diagrams of computer-implemented methods 200 and 300 for detecting events based upon attributes read by a plurality of entities 130, according to an example. The method 300 depicted in FIG. 3 provides a more detailed illustration of the method 200 depicted in FIG. 2. It should be understood that the methods 200 and 300 may include additional steps and that one or more of the steps described herein may be removed and/or modified without departing from the scopes of the methods 200 and 300.

The descriptions of the methods 200 and 300 are made with reference to the environment 100 depicted in FIG. 1 and thus makes particular reference to the elements contained in the environment 100. It should, however, be understood that the methods 200 and 300 may be implemented in an environment that differs from the environment 100 without departing from the scopes of the methods 200 and 300.

With reference first to FIG. 2, at step 202, the analyzer 110 implements or invokes the data input module 112 to receive data pertaining to attributes read by the entities 130. As described above, the analyzer 110 may receive the data as streaming data or bursts of data directly from the entities 130 or through one or more base stations 134. As further described above, the entities 130 are classified into a plurality of groupings in each of a plurality of hierarchical levels. The classification of the entities 130 may automatically be performed by the analyzer 110 or the classification may be user-defined.

At step 204, the analyzer 110 implements or invokes the correlation analysis module 118 to perform a correlation analysis on the received data. As discussed above, the correlation analysis may include a process in which relationships among a set of data are quantified or qualified to identify one or more independent variables that fairly closely represent the correlations between the data contained in the set. In any regard, the correlation analysis module 118 performs the correlation analysis on the data to identify a number of independent variables existing among the read attributes for each of the plurality of groupings in a first hierarchical level of the plurality of hierarchical levels.

At step 206, the analyzer 110 implements or invokes the event detection module 120 to determine whether an event has occurred. More particularly, the event detection module 120 compares the number of independent variables for each of the plurality of groupings in the first hierarchical level identified through performance of the correlation analysis on the data with a nominal number of independent variables for each of the plurality of groupings in the first hierarchical level.

At step 208, the analyzer 110 outputs a representation of the detected events to one or more outputs 160. As discussed above, the analyzer 110 may output a visual, auditory, etc., indication that an event has been detected to have occurred.

As described in greater detail herein below with respect to the following flow diagram of the method 300, the analyzer 110 is configured to repeat various steps in the method 200 for the groupings of entities and at the multiple hierarchical levels to further identify events that may occur at the higher hierarchical levels.

With particular reference now to FIG. 3, at step 302, the analyzer 110 implements or invokes the data input module 112 to receive data pertaining to attributes read by the entities 130. In addition, at step 304, the analyzer 110 implements or invokes the pre-processing module 114 to pre-process attribute data contained in the data, as discussed above.

At step 306, the analyzer 110 sets the initial hierarchical level i=1, which represents the lowest level in the hierarchy of levels. As discussed above, the entities 130 are classified into a plurality of groupings in each of a plurality of hierarchical levels. The classification of the entities 130 may automatically be performed by the analyzer 110 or the classification may be user-defined. By way of example, hierarchical level i=1 may represent the rack level and the groupings of the entities 130 may each include the entities 130 of a respective racks.

At step 308, the analyzer 110 invokes or implements the correlation analysis module 118 to perform a correlation analysis on the data to identify a number of independent variables existing among the read attributes for each of the plurality of groupings in the first hierarchical level of the plurality of hierarchical levels. In instances where the data received at step 302 is received as streaming data, the correlation analysis module 118 may perform an incremental correlation analysis on the streaming data by analyzing the data as it is received.

At step 310, the analyzer 110 invokes or implements the event detection module 120 to determine whether an event has occurred in any of the groups of the first hierarchical level. Thus, for instance, the event detection module 120 determines whether the number of independent variables for each of the groups falls outside of the predetermined value from the nominal number of independent variables.

At step 312, for those groups whose number of independent variables is the same or within a predetermined range of the nominal number of independent variables, the analyzer 110 determines whether there is an additional hierarchical level to be analyzed. If there is an additional hierarchical level to be analyzed, the analyzer 110 increments a counter by 1. As such, in a first iteration of step 314, the hierarchical level i is set to 2. In addition, steps 308-318 are performed on the group(s) of the second hierarchical level.

At step 316, for those groups whose number of independent variables differs from or is outside of a predetermined range of the nominal number of independent variables, the event detection module 120 determines that an event has been detected. In addition, the event detection module 120 identifies the one or more entities 130 associated with the detected event.

By way of particular example, the correlation module 118 may implement incremental PCA to correlate the received streaming data as each data point arrives. The correlation analysis module 118 arranges the data and timestamps in a matrix X. An example of a matrix 400 formed from the data and timestamps is depicted in FIG. 4. In the matrix 400, $x_n$ denotes the entity 130 associated with respective components 132a-132n, T1-T5 denote the read attributes, and t denotes the timestamp at which the data was collected. An example of a manner in which correlation analysis module 118 may be implemented to identify the number of independent (hidden) variables contained in a linear transform that is used to reconstruct the data contained in the matrix X is depicted in the flow diagram of the method 500 in FIG. 5. The analyzer 110 may implement the method 500 for each of the groups in the hierarchical levels to perform steps 308-316 in the method 300.

Figure 5:
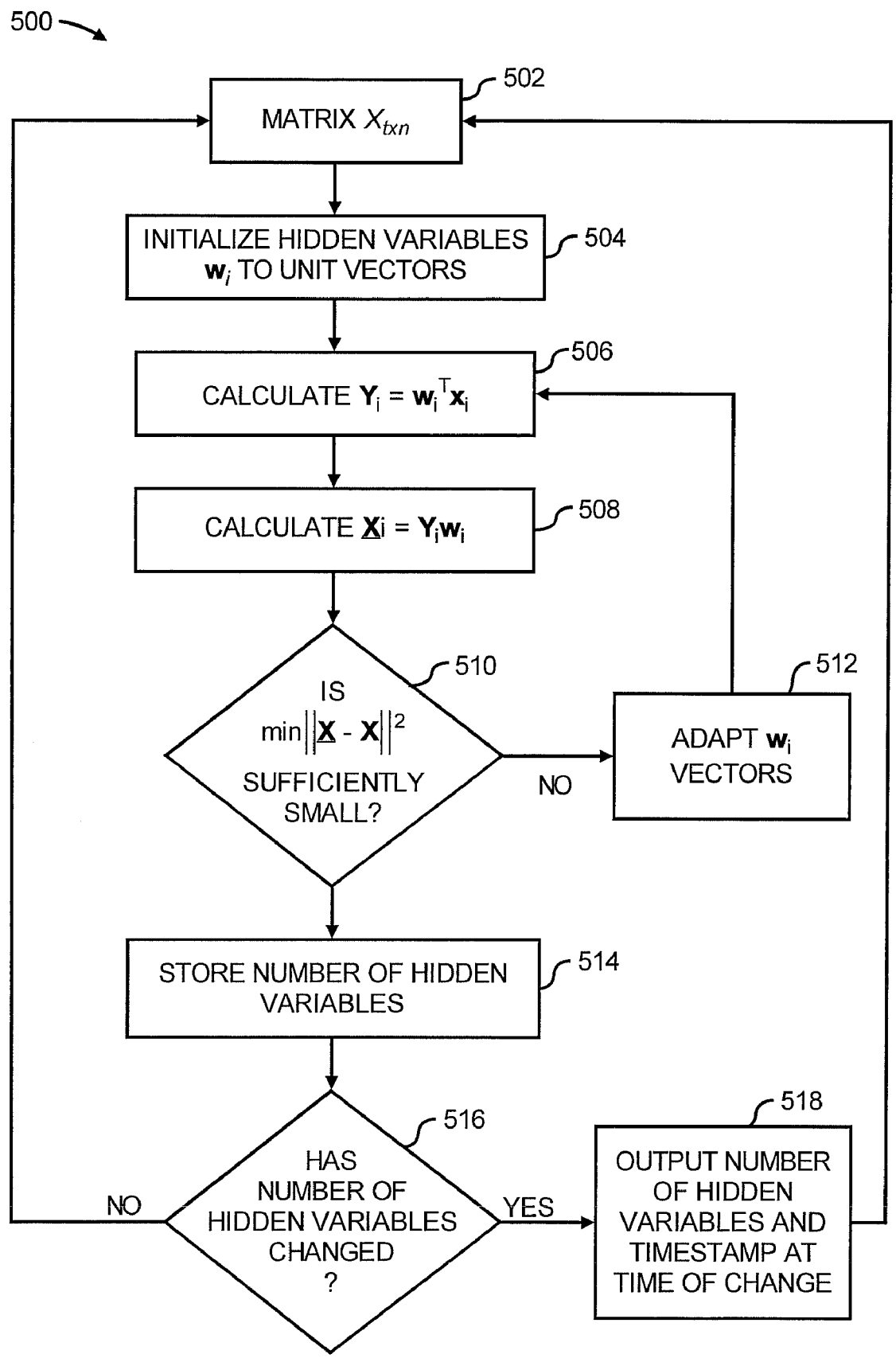
FIG. 5 shows a flow diagram of a method for performing PCA to obtain a number of independent (hidden) variables and a timestamp at which a change in a detected condition occurred, according to an embodiment of the invention.

With particular reference to FIG. 5, at step 502, the matrix X is inputted into the correlation analysis module 118. At step 504, the correlation analysis module 118 initializes the hidden variables $w_i$ to be unit vectors. In addition, at step 506, the correlation analysis module 118 calculates a matrix Y, which is a transformation of the principal components of the data, through the following equation:

$$Y_i = w_i^T x_i.$$ Equation (1):

At step 508, the analyzer 110 calculates a matrix $\underline{X}$, which generally comprises a reconstruction of the X matrix, through the following equation:

$$\underline{X}_i = Y_i w_i.$$ Equation (2):

At step 510, the correlation analysis module 118 calculates a difference between the reconstructed matrix $\underline{X}$ and the original matrix X and determines whether the difference is sufficiently small. By way of example, the difference may be considered to be sufficiently small if the reconstructed matrix $\underline{X}$ is at least about 95% of the original matrix X. In other words, the difference is considered as being sufficiently small if the model calculated at step 506 is at least about 95% accurate.

If the correlation analysis module 118 determines that the difference is not sufficiently small at step 510, the correlation analysis module 118 adapts the hidden variable $w_i$ vectors at step 512. In addition, the correlation analysis module 118 repeats steps 506-512 until a linear model that approximates the original matrix X is identified to at least a minimum degree of accuracy.

Once the correlation analysis module 118 determines that such a linear model has been found at step 510, the correlation analysis module 118 stores the number of hidden variables $w_i$ contained in the linear model, as indicated at step 514. In addition, at step 516, the event detection module 120 compares the number of hidden variables stored at step 514 with any previously stored number of hidden variables to determine whether the number of hidden variables has changed. In addition, or alternatively, the event detection module 120 compares the stored number of hidden variables with a nominal number of hidden variables, for instance, as determined through testing, to determine whether the stored number of hidden variables has changed from the nominal number of hidden variables.

If the event detection module 120 determines that the number of hidden variables has changed or that the number of hidden variables has changed from the nominal, the analyzer 110 outputs the number of hidden variables and a timestamp at which the change occurred at step 518. In other words, when a change in the number of hidden variables occurs, the analyzer 110 determines that an event has occurred, such as an anomaly, in the sensed data. Generally speaking, an increase in the number of hidden variables is an indication that the total energy of the reconstructed matrix X is higher than the total energy of the original matrix X and that there was an event or anomaly. A decrease in the number of hidden variables is an indication that the conditions in the environment 100 are returning to a normal state.

Following step 518, the analyzer 110 repeats steps 502-518 to continue tracking the environment 100 for events.

With reference back to FIG. 3, if an event is detected, at step 316, the analyzer 110 identifies the principal entities associated with the event from a vector of participation weight contained in the reconstructed matrix X. More particularly, for instance, the principal entities comprise those entities having the greatest values in the columns of the reconstructed matrix X because the matrix of weights is ordered by the significance of the principal components. In addition, the position of the entity 130 is related to the position of the data in the matrix X. As such, the principal entities, that is, those entities having the most significance in the correlation analysis, are identified based upon the positions of their weights in the reconstructed matrix X. By way of example, those entities 130 that detect the greatest number of changes may comprise the principal entities.

At step 318, the analyzer 110 implements or invokes the data removal module 122 to remove data related to the one or more entities 130 determined at step 316 to be closely associated with the event. In addition, at step 312, the analyzer 110 determines whether there is an additional hierarchical level to be analyzed. If there is an additional hierarchical level to be analyzed, the analyzer 110 increments a counter by 1. As such, in a first iteration of step 314, the hierarchical level i is set to 2, in a second iteration of step 314, the hierarchical level i is set to 3, etc. In addition, steps 308-318 are performed on the group(s) of the hierarchical level indicated at step 314 using the data received at step 302 with the data collected from the one or more entities 130 identified as being related to the event removed from the correlation analysis. Moreover, the analyzer 110 repeats steps 308-318 for each of the groupings in each of the remaining hierarchical levels until a determination that there are no additional levels to be analyzed at step 312 is made.

In one regard, by removing the data received from the one or more entities 130 identified as being related to the event and performing a correlation analysis on the remaining data at the higher hierarchical level, the analyzer 110 may determine whether an event caused by at least one other entity 130 has occurred at the higher hierarchical level. The analyzer 110 may use this determination to identify the magnitude or scope of the event. More particularly, for instance, the analyzer 110 may determine whether the detected event is isolated to the first hierarchical level or whether it is more widespread and thus affects a second or higher hierarchical level.

At step 320, the analyzer 110 may output a notification of whether an event was detected. Thus, for instance, if no events are detected for any of the hierarchical levels, the analyzer 110 may output a notification that no events were detected at step 320. However, if at least one event has been detected at step 316, the analyzer 110 may output a notification of the at least one event at step 320. In addition, the analyzer 110 may continuously repeat the method 300 to continually monitor the data received from the entities 130 for any events occurring in the environment 100.

Some or all of the operations set forth in the methods 200, 300, and 500 may be contained as one or more utilities, programs, or subprograms, in any desired computer accessible or readable medium. In addition, the methods 200, 300, and 500 may be embodied by a computer program, which may exist in a variety of forms both active and inactive. For example, it can exist as software program(s) comprised of program instructions in source code, object code, executable code or other formats. Any of the above can be embodied on a computer readable medium.

Exemplary computer readable storage devices include conventional computer system RAM, ROM, EPROM, EEPROM, and magnetic or optical disks or tapes. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 6:
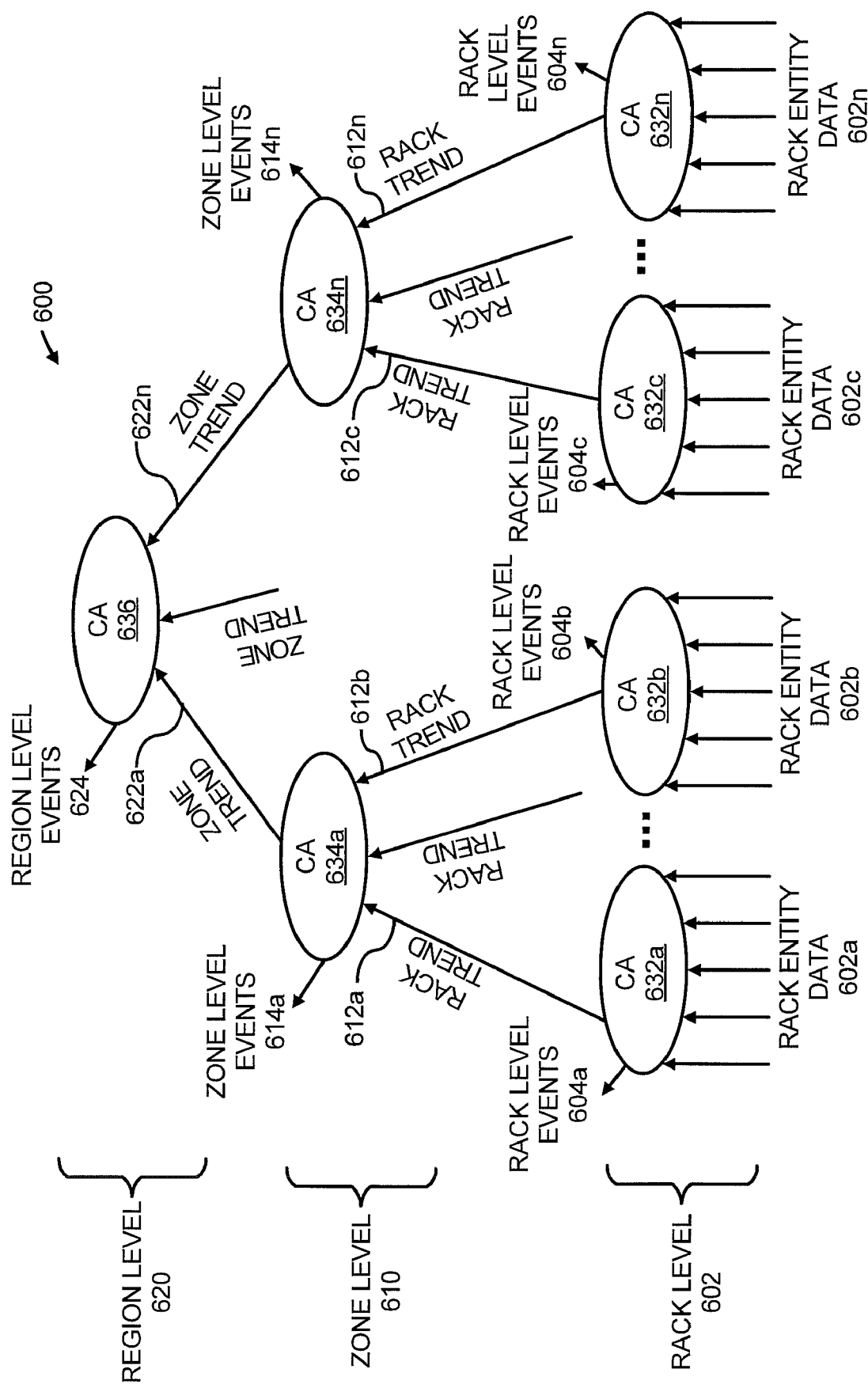
FIG. 6 shows a diagram of a hierarchical configuration of a data center environment, according to an embodiment of the invention.

Turning now to FIG. 6, there is shown a diagram of a hierarchical configuration 600 of a data center environment 100, according to an example. It should be understood that the hierarchical configuration 600 may include additional hierarchical levels, groups, or entities 130 and that one or more of the elements may be removed and/or modified without departing from a scope of the invention. For simplicity and illustrative purposes, the hierarchical configuration 600 is depicted to have a rack level 602 comprising entity 130 inputs grouped together based on their physical locality on a particular rack. However, the entity 130 inputs may be organized in any manner, such as locality based on data center cooling infrastructure, on server workload, power consumption, component configurations, etc., without departing from a scope of the invention.

Generally speaking, the data center environment illustrated in FIG. 6 is organized in a hierarchical configuration 600 to detect events occurring at different levels in the hierarchical configuration 600. More particularly, the hierarchical configuration 600 also enables detection of the magnitude or scope of an event occurring in the data center environment.

By way of particular example, the hierarchical grouping module 116 groups the entities 130 into three hierarchical levels: a rack level 602 composed is individual racks, a zone level 610 composed of groups of racks, and a region level 620 composed of groups of zones. In this particular example, the rack level 602 is the first level in the hierarchy which represents a plurality of groups of rack entity data 602a-602n, where "n" is an integer equal to or greater than one. In addition, each group of the rack entity data 602a-602n is associated with data received from entities 130 housed in a particular rack.

As further shown in FIG. 6, the correlation analysis module 118 performs respective correlation analyses 632a-632n on each group of rack entity data 602a-602n to identify independent variables. In addition, the event detection module 120 analyzes the results of the respective correlations analyses 632a-632n (independent variables) to identify rack level events 604a-604n and the one or more entities 130 associated with the events 604a-604n. Various manners in which the analyzer 110 performs the respective correlation analyses 632a-632n on the data received from the entities 130 is described in greater detail with respect to the method 500.

Rack trends 612a-612n, represented by independent variables discovered during the correlation analyses 632a-632n, are outputted to the correlation analysis module 118 to use in performing respective correlation analyses 634a-634n on the groups in the zone level 610. More particularly, for instance, the correlation analysis module 118 is configured to analyze the rack trends 612a-612n associated with each of the respective groups in the zone level 610 with the data pertaining to the entities 130 associated with the events 604a-604n removed from the analysis. In addition, the event detection module 120 analyzes the results of the respective correlations analyses 634a-634n (independent variables) to identify zone level events 614a-614n and the one or more entities 130 associated with the zone-level events 614a-614n. Various manners in which the analyzer 110 performs the respective correlation analyses 634a-634n on the data received from the entities 130 is described in greater detail with respect to the method 500.

Zone trends 622a-622n, represented by independent variables discovered during the correlation analyses 634a-634n, are outputted to the correlation analysis module 118 to use in performing a correlation analysis 636 on the group(s) in the region level 620. More particularly, for instance, the correlation analysis module 118 is configured to analyze the zone trends 622a-622n associated with the region level 620 with the data pertaining to the entities 130 associated with the rack level events 604a-604n and the zone level events 614a-614n removed from the analysis. In addition, the event detection module 120 analyzes the results of the respective correlations analyses 636 (independent variables) to identify region level events 624 and the one or more entities 130 associated with the region level events 624. Various manners in which the analyzer 110 performs the correlation analysis 636 on the data received from the entities 130 is described in greater detail with respect to the method 500.

Figure 7:
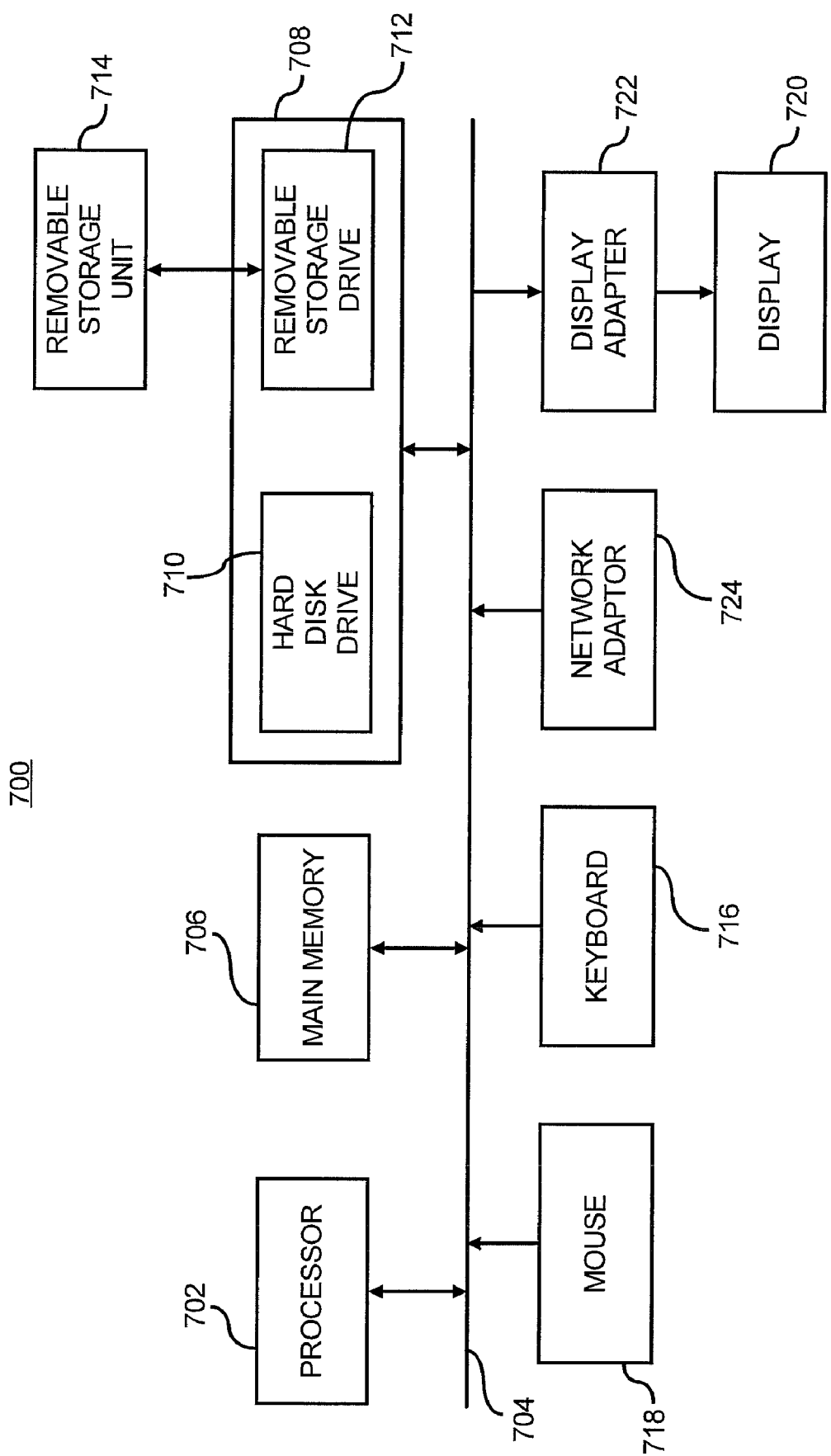
FIG. 7 illustrates a computer system, which may be employed to perform various functions of the analyzer depicted in FIG. 1 in performing some or all of the steps contained in the diagrams depicted in FIGS. 2, 3, and 5, according to an embodiment of the invention.

FIG. 7 illustrates a computer system 700, which may be employed to perform the various functions of the analyzer 110 described herein above with, according to an example. In this respect, the computer system 700 may be used as a platform for executing one or more of the functions described hereinabove with respect to the analyzer 110.

The computer system 700 includes a processor 702, which may be used to execute some or all of the steps described in the methods 200, 300, and 500. Commands and data from the processor 702 are communicated over a communication bus 704. The computer system 700 also includes a main memory 706, such as a random access memory (RAM), where the program code may be executed during runtime, and a secondary memory 708. The secondary memory 708 includes, for example, one or more hard disk drives 710 and/or a removable storage drive 712, representing a floppy diskette drive, a magnetic tape drive, a compact disk drive, etc., where a copy of the program code for detecting events in an environment may be stored.

The removable storage drive 710 reads from and/or writes to a removable storage unit 714 in a well-known manner. User input and output devices may include a keyboard 716, a mouse 718, and a display 720. A display adaptor 722 may interface with the communication bus 704 and the display 720 and may receive display data from the processor 702 and convert the display data into display commands for the display 720. In addition, the processor 702 may communicate over a network, for instance, the Internet, LAN, etc., through a network adaptor 724.

It will be apparent to one of ordinary skill in the art that other known electronic components may be added or substituted in the computer system 700. In addition, the computer system 700 may include a system board or blade used in a rack in a data center, a conventional "white box" server or computing device, etc. Also, one or more of the components in FIG. 7 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A computer readable storage medium on which is embedded one or more computer programs, said one or more computer programs implementing a method for detecting events based upon attributes read by a plurality of entities, said one or more computer programs comprising computer code for:
   receiving data pertaining to the read attributes from the plurality of entities;
   performing a correlation analysis on the data to identify a number of independent variables existing among the read attributes for each of a plurality of groupings of the plurality of entities in a first hierarchical level of the plurality of hierarchical levels;
   comparing the identified number of independent variables with a nominal number of independent variables for each of the plurality of groupings in the first hierarchical level; and
   determining that an event has been detected in response to the identified number of independent variables falling outside of a predetermined value from the nominal number of independent variables for a particular grouping in the first hierarchical level.

2. The computer readable storage medium according to claim 1, further comprising computer code for:
   in response to a determination that an event has not been detected, performing another correlation analysis on the data to identify a number of independent variables existing among the read attributes for each of the plurality of groupings in a second hierarchical level of the plurality of hierarchical levels;
   comparing the identified number of independent variables with a nominal number of independent variables for each of the plurality of groupings in the second hierarchical level; and
   determining that an event has been detected in response to the identified number of independent variables falling outside of the predetermined value of the nominal number of independent variables for a particular grouping in the second hierarchical level.

3. The computer readable storage medium according to claim 2, further comprising computer code for:
   in response to a determination that an event has occurred, determining a magnitude of the event occurrence based upon the hierarchical level in which the event is determined to have occurred.

4. The computer readable storage medium according to claim 1, further comprising computer code for:

in response to a determination that an event has occurred, identifying one or more entities associated with the event; and removing data related to the one or more entities identified as being associated with the event to prevent the removed data from being considered during a correlation analysis performed on the data at a higher hierarchical level.

5. The computer readable storage medium according to claim 4, further comprising computer code for:

identifying one or more entities associated with the event in response to a determination that an event has been detected based upon respective probabilities that the one or more entities caused the number of independent variables to differ from the nominal number of independent variables for a particular grouping.

6. The computer readable storage medium according to claim 1, wherein the first hierarchical level of the plurality of hierarchical levels contains a first group having a first set of entities and a second group having a second set entities, wherein the first set of entities differs from the second set of entities, and wherein a second hierarchical level of the plurality of hierarchical levels contains a third group containing the first set of entities and the second set of entities.

7. The computer readable storage medium according to claim 1, wherein receiving the data further comprises computer code for receiving the data as streaming data and wherein performing the correlation analysis further comprises performing an incremental correlation analysis on the streaming data.

8. The computer readable storage medium according to claim 1, further comprising computer code for:

identifying the nominal number of independent variables for each of the plurality of groupings in the plurality of hierarchical levels by performing a correlation analysis on data containing attributes that are at least one of read in real time and previously read.

9. The computer readable storage medium according to claim 1, wherein the data center comprises a plurality of racks, wherein the plurality of entities are positioned with respect to the plurality of racks, said one or more computer programs further comprising computer code for:

classifying the plurality of entities in a first rack of the plurality of racks into a first group of the first hierarchical level;

classifying the plurality of entities in a second rack of the plurality of racks into a second group of the first hierarchical level; and classifying the plurality of entities in the first rack and the second rack into a third group of a second hierarchical level of the plurality of hierarchical levels.

10. The computer readable storage medium according to claim 1, further comprising computer code for:

pre-processing the received data to render the data to be suitable for the correlation analysis to be performed on the data.

11. The computer readable storage medium according to claim 1, further comprising computer code for:

classifying each of the plurality of entities into the plurality of groupings in each of the plurality of hierarchical levels.

12. A computer-implemented analyzer for detecting events in an environment, said computer-implemented analyzer comprising:

a data input module configured to receive data pertaining to the attributes read by a plurality of entities;

a correlation analysis module configured to perform a correlation analysis on the data to identify a number of independent variables existing among the read attributes for each of a plurality of groupings of entities, wherein the plurality of groupings of entities is in a first hierarchical level of a plurality of hierarchical levels of entities; and an event detection module configured to determine whether an event is detected from an analysis of the independent variables identified by the correlation analysis module, wherein the event detection module is configured to determine that an event has been detected in response to the identified number of independent variables for at least one of the plurality of groupings falling outside of a predetermined value from a nominal number of independent variables for the at least one of the plurality of groupings.

13. The computer-implemented analyzer according to claim 12, further comprising:

a hierarchical grouping module configured to classify the plurality of entities into a plurality of groupings of the plurality of hierarchical levels based upon at least one characteristic of the plurality of entities.

14. The computer-implemented analyzer according to claim 12, wherein the correlation analysis module is configured to perform another correlation analysis on the data to identify a number of independent variables existing among the read attributes for each of the plurality of groupings in a second hierarchical level of the plurality of hierarchical levels and wherein the event detection module is configured to determine that an event has been detected in response to the identified number of independent variables for at least one of the plurality of groupings in the second hierarchical level falling outside of a predetermined value from a nominal number of independent variables for the at least one of the plurality of groupings in the second hierarchical level.

15. The computer-implemented analyzer according to claim 14, wherein the event detection module is further configured to determine a magnitude of the event occurrence based upon the hierarchical level in which the event is determined to have occurred.

16. The computer-implemented analyzer according to claim 12, wherein the event detection module is further configured to identify one or more entities associated with the event, said computer-implemented analyzer further comprising:

a data removal module configured to remove data related to the one or more entities identified as being associated with the event to prevent the removed data from being considered by the correlation analysis module during a correlation analysis performed on the data at a higher hierarchical level.

17. The computer-implemented analyzer according to claim 16, wherein the event detection module is configured to identify one or more entities associated with the event based upon respective probabilities that the one or more entities caused the number of independent variables to fall outside of the predetermined value from the nominal number of independent variables for a particular grouping.

18. The computer-implemented analyzer according to claim 16, further comprising:

a preprocessing module configured to pre-process the data received from the entities to render the data to be suitable for a correlation analysis to be performed on the received data by the correlation analysis module.

19. A computer system comprising:
- a data input module configured to receive data pertaining to the attributes read by a plurality of entities;
- a hierarchical grouping module configured to classify the plurality of entities into a plurality of groupings of a plurality of hierarchical levels based upon at least one characteristic of the plurality of entities;
- a correlation analysis module configured to perform a correlation analysis on the data to identify a number of independent variables existing among the read attributes for each of the plurality of groupings of entities, wherein the plurality of groupings of entities is in a first hierarchical level of the plurality of hierarchical levels of entities; and
- an event detection module configured to determine whether an event is detected from an analysis of the independent variables identified by the correlation analysis module, wherein the event detection module is configured to determine that an event has been detected in response to the identified number of independent variables for at least one of the plurality of groupings falling outside of a predetermined value from a nominal number of independent variables for the at least one of the plurality of groupings.

20. The computer system according to claim 19, wherein the event detection module is further configured to identify one or more entities associated with the event, said computer system further comprising:
- a data removal module configured to remove data related to the one or more entities identified as being associated with the event to prevent the removed data from being considered by the correlation analysis module during a correlation analysis performed on the data at a higher hierarchical level.

\* \* \* \* \*